United States Patent
Toufik et al.

(10) Patent No.: US 8,255,000 B2
(45) Date of Patent: Aug. 28, 2012

(54) PROCESS FOR COMPUTING A FREQUENCY OFFSET FOR A UMTS COMMUNICATION SYSTEM BASED ON THE CPICH PILOT SIGNALS

(75) Inventors: Issam Toufik, Juan les pins (FR); Andrea Ancora, Nice (FR)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/322,629

(22) PCT Filed: Jun. 2, 2010

(86) PCT No.: PCT/EP2010/003335
§ 371 (c)(1),
(2), (4) Date: Feb. 13, 2012

(87) PCT Pub. No.: WO2010/139458
PCT Pub. Date: Dec. 9, 2010

(65) Prior Publication Data
US 2012/0157162 A1   Jun. 21, 2012

(30) Foreign Application Priority Data
Jun. 2, 2009  (EP) .................................... 09368017

(51) Int. Cl.
*H04M 1/00*   (2006.01)
(52) U.S. Cl. ............... 455/562.1; 455/161.1; 455/67.11; 455/71; 455/334; 455/344; 375/316; 375/350; 375/347; 375/349; 370/252; 370/328; 370/350; 370/342
(58) Field of Classification Search ......... 455/62–67.11, 455/68–71, 39, 423, 334, 161.1, 444–452.1, 455/561–562.1; 375/316, 324, 326, 350; 370/252, 328–338, 350, 342
See application file for complete search history.

(56) References Cited

U.S. PATENT DOCUMENTS

| | | | | |
|---|---|---|---|---|
| 7,643,587 B2 * | 1/2010 | Tanaka et al. | ................. | 375/344 |
| 2004/0137851 A1 * | 7/2004 | Akhter et al. | ................. | 455/71 |
| 2005/0186924 A1 * | 8/2005 | Hur | .......................... | 455/161.1 |
| 2005/0286611 A1 * | 12/2005 | Priotti | .......................... | 375/144 |
| 2006/0251190 A1 * | 11/2006 | Wang et al. | ................. | 375/330 |
| 2008/0151839 A1 * | 6/2008 | Litwin et al. | ................. | 370/336 |
| 2008/0273635 A1 * | 11/2008 | Neuhaus et al. | ............. | 375/344 |

FOREIGN PATENT DOCUMENTS
EP   1 249 980 A2   10/2002
JP   2004072458 A   3/2004

OTHER PUBLICATIONS

International Search Report issued in corresponding International Patent Application No. PCT/EP2010/003335, mailing date Aug. 16, 2010.

(Continued)

*Primary Examiner* — Nick Corsaro
*Assistant Examiner* — Sarwat Chughtai
(74) *Attorney, Agent, or Firm* — Potomac Patent Group PLLC (57) ABSTRACT

Process for computing an estimation of the frequency offset in a receiver for a UMTS communication network said receiver receives the signal transmitted by two antennas and including two Common Pilot CHannels (CPICH), said process involving the steps of separating the two signals by means of computation and computing the frequency offset on the base of the two separated signals

12 Claims, 6 Drawing Sheets

OTHER PUBLICATIONS

International Preliminary Report on Patentability for corresponding International Patent Application No. PCT/EP2010/003335, issued Dec. 6, 2011.

Written Opinion of the International Searching Authority issued in corresponding International Patent Application No. PCT/EP2010/003335, mailing date Aug. 16, 2010.

* cited by examiner

PROCESS FOR COMPUTING A FREQUENCY OFFSET FOR A UMTS COMMUNICATION SYSTEM BASED ON THE CPICH PILOT SIGNALS

TECHNICAL FIELD

The invention relates to the field of wireless communication and more particularly to a process for estimating the frequency offset in third generation wireless communication systems, particularly for UMTS.

BACKGROUND ART

Universal Mobile Telecommunications Systems (UMTS) is based on the W-CDMA technology and is in the heart of the 3G communication networks providing packet based transmission of text, digitized voice, and multimedia data at rates up to 2 Megabits per second.

One particular case of UMTS is defined in the 3G specification, where one base station of such a communication systems may comprise two emitting antennas each transmitting one signal comprising one corresponding Common Pilot CHannel (CPICH). The transmitted sequence of pilots from each antenna is constructed by applying a sign pattern given by FIG. 1 to the symbol(1+j), where j is to the imaginary complex such as $j^2=-1$.

Figure 1:
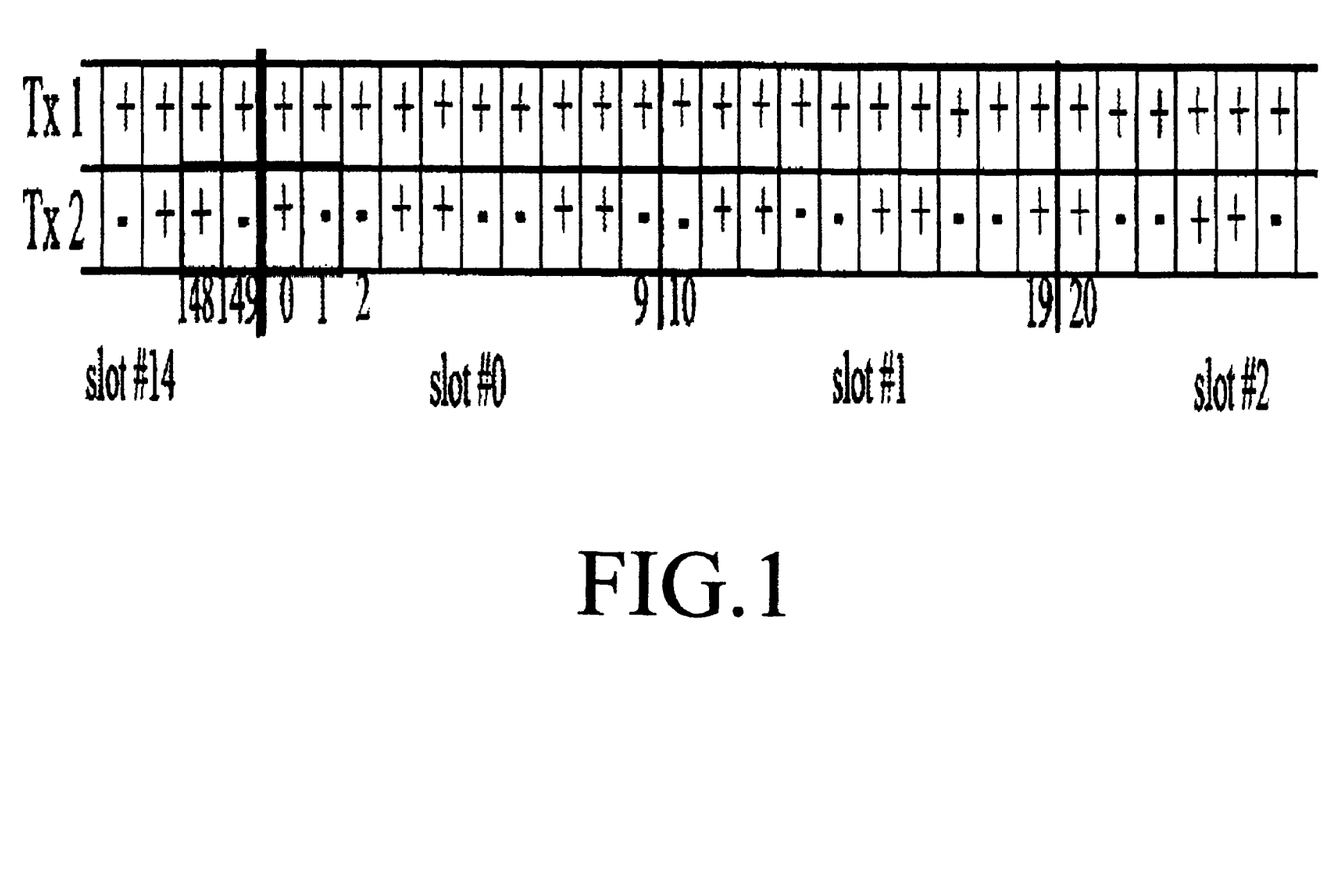
FIG. 1 illustrates the structure of the sign patter (applied to (1+j)) of the two CPICH pilots sequences which are used in the UMTS using transmit diversity (TxD)

FIG. 1: This figure represents the pattern of the transmitted CPICH pilots' sequence.

Those two pilot signals which are transmitted by the base station are used for the determination of the channel characteristics but also for estimating the frequency offset between the base station reference clock and the internal clock of the User Equipment (UE). The received signal corresponding to the transmission of the $k^{th}$ pilot sample in the absence of frequency offset is given by:

$$r[k] = (1+j)\left(h_1[k] + (-1)^{\lfloor\frac{k+1}{2}\rfloor}h_2[k]\right) + n[k]$$

while when the UE is subject to a frequency offset with respect to the base station, the received signal is then $$r[k] = (1+j)\left(h_1[k] + (-1)^{\lfloor\frac{k+1}{2}\rfloor}h_2[k]\right)\exp(j2\pi k\Delta fT + \varphi_0) + n[k]$$

Where $h_m[k]$ corresponds to the channel response from antenna m (m=1, 2) and at the time instant of transmission of the $k^{th}$ pilot, $\Delta f$ is the frequency offset, T is the time duration between two consecutive samples and $\phi_0$ is an initial phase rotation.

Some techniques are already known for computing an estimation of the frequency offset based on the computation of phase discriminator.

However, the techniques which are known do not achieve both accuracy in the estimation of the offset and still operate in a relatively wide range of frequency offsets.

It is particularly desirable to be able to estimate an offset in the maximum range allowed by an estimation based on the CPICH, while providing accuracy in the estimation. This maximum range is given by $$|\Delta f| \le \frac{1}{2T},$$

where T is the time between two consecutive CPICH pilots. In UMTS $$T = \frac{1}{15}10^{-3}$$

seconds, which corresponds to covering a range of frequency offsets from minus to plus 7500 Hz.

Such is the goal of the present invention.

SUMMARY OF THE INVENTION

It is an object of the present invention to provide an efficient frequency offset estimation method which is suitable for direct-sequence (DS) spread-spectrum systems and particularly for the 3GPP UMTS standard.

It is a further object of the present invention to provide a method which provides both accuracy and wide range of estimation of the frequency offset.

It is another object of the present invention to provide a receiver for a UMST communication system which incorporates improved frequency offset estimation mechanisms.

These and other objects of the invention are achieved by means of a process for computing an estimation of the frequency offset which involves a pre-processing based on the separation at the receiver of the two pilot signals transmitted from the two antennas by means of the computation of $$r_{NoTxd}[k] = r[k] + r[k+2] = (1+j)\left(S_1[k] + (-1)^{\lfloor\frac{k+1}{2}\rfloor}D_2[k]\right) + N_s[k]$$

$$r_{Txd}[k] = (-1)^{\lfloor\frac{k+1}{2}\rfloor}(r[k] - r[k+2]) =$$

$$(1+j)\left(S_2[k] + (-1)^{\lfloor\frac{k+1}{2}\rfloor}D_1[k]\right) + (-1)^{\lfloor\frac{k+1}{2}\rfloor}N_d[k]$$

Where
r[k] is the received signal at the instant k;
Where $r_{NoTxd}$ and $r_{Txd}$ are the received pilot signals from antenna 1 and from antenna 2 respectively, assuming that the channel does not change (i.e. $h_1[k]=h_1$ and $h_2[k]=h_2$) and where for m=1,2:

$S_m[k]=h_m\exp(j\phi_0)(\exp(jk\Phi)+\exp(j(k+2)\Phi))$, $D_m[2k]=h_m\exp(j\phi_0)(\exp(jk\Phi)-\exp(j(k+2)\Phi))$ $N_s[k]=n[k]+n[k+2]$ $N_d[k]=n[k]-n[k+2]$ and $\Phi=2\pi\,\Delta f\,T$
we then compute $R_{r_{NoTxd}r_{NoTxd}}[k]=r_{NoTxd}[k]^*\mathrm{conj}(r_{NoTxd}[k+1])$ $R_{r_{Txd}r_{Txd}}[k]=r_{Txd}[k]^*\mathrm{conj}(r_{Txd}[k+1])$ where conj(.) is the complex conjugate operator.

With the assumption that the channel does not change (i.e. $h_1[k]=h_1$ and $h_2[k]=h_2$) and after simplification, we have $$R_{r_{NoTxd}r_{NoTxd}}[k] = 2\Big(R_{S_1S_1} + (-1)^{\lfloor\frac{k+1}{2}\rfloor}(-1)^{\lfloor\frac{k+2}{2}\rfloor}R_{D_2D_2} +$$
$$(-1)^{\lfloor\frac{k+2}{2}\rfloor}R_{S_1D_2} + (-1)^{\lfloor\frac{k+1}{2}\rfloor}R_{D_2S_1}\Big) + R_{N_sN_s}[k]$$

$$R_{r_{Txd}r_{Txd}}[k] = 2\Big(R_{S_2S_2} + (-1)^{\lfloor\frac{k+1}{2}\rfloor}(-1)^{\lfloor\frac{k+2}{2}\rfloor}R_{D_1D_1} + (-1)^{\lfloor\frac{k+2}{2}\rfloor}R_{S_2D_1} +$$
$$(-1)^{\lfloor\frac{k+1}{2}\rfloor}R_{D_1S_2}\Big) + (-1)^{\lfloor\frac{k+1}{2}\rfloor}(-1)^{\lfloor\frac{k+2}{2}\rfloor}R_{N_dN_d}[k]$$

where, for $m=1,2$ and $n=1,2$ $R_{S_mS_m} = S_m[k].\text{conj}(S_m[k+1]) = 2|h_m|^2(\exp(j\Phi)(1+\cos(2\Phi)))$ $R_{D_mD_m} = D_m[k].\text{conj}(D_m[k+1]) = 2|h_m|^2(\exp(j\Phi)(1-\cos(2\Phi)))$ $R_{S_mD_n} = S_m[k].\text{conj}(D_n[k+1]) = -2jh_mh_n^*\exp(j\Phi)\sin(2\Phi)$ $R_{N_sN_s} = N_s[k].\text{conj}(N_s[k+1])$ $R_{N_dN_d} = N_d[k].\text{conj}(N_d[k+1])$ In one embodiment, the estimation is based on one estimator $R_{even,avr}$ computed in accordance with the following formulas:

$$R_{even,avr} = \frac{1}{N_2 - N_1} \sum_{k=N_1, k\ even}^{N_2} (R_{r_{Txd}r_{Txd}}[k] + R_{r_{NoTxd}r_{NoTxd}}[k])$$

which simplifies to:

$R_{even,avr} =$ $$4\exp(j\Phi)(|h_1|^2 + |h_2|^2)\cos(2\Phi) + \frac{1}{N_2 - N_1} \sum_{k=N_1, k\ even}^{N_2} (R_{N_sN_s}[k] - R_{N_dN_d}[k])$$

where $N_1$ and $N_2$ are respectively the indices of the first and the last CPICH symbols used for the frequency offset estimation. The use of the average tends to attenuate the effect of noise by averaging over several symbols. The frequency offset estimate being provided by the formula:

$$\Delta f = \frac{1}{2\pi T}\arctan\left(\frac{\Im m(R_{even,avr})}{\Re e(R_{even,avr})}\right)$$

where $\Re e(.)$ and $\Im m(.)$ are respectively the imaginary part and real part operators. Alternatively, the frequency offset estimation is based on one estimator $R_{odd,avr}$ computed in accordance with the following formulas:

$$R_{odd,avr} = \frac{1}{N_2 - N_1} \sum_{k=N_1, k\ odd}^{N_2} (R_{r_{Txd}r_{Txd}}[k] + R_{r_{NoTxd}r_{NoTxd}}[k])$$

which simplifies to $$R_{odd,avr} = 4\exp(j\Phi)(|h_1|^2 + |h_2|^2) + \frac{1}{N_2 - N_1} \sum_{k=N_1, k\ odd}^{N_2} (R_{N_sN_s}[k] + R_{N_dN_d}[k])$$

where $N_1$ and $N_2$ are respectively the indices of the first and the last pilot symbols used for the frequency offset estimation. The use of the average tends to attenuate the effect of noise by averaging over several symbols. The frequency offset estimate being provided by the formula:

$$\Delta f = \frac{1}{2\pi T}\arctan\left(\frac{\Im m(R_{odd,avr})}{\Re e(R_{odd,avr})}\right)$$

In one particular, embodiment, the estimation is computed on the basis of both $R_{odd,avr}$ and $R_{even,avr}$ in accordance with the formula:

If $|\Re e(R_{odd,avr})| > |\Im m(R_{odd,avr})|$ $R = R_{odd,avr} + R_{even,avr}$ else $R = R_{odd,avr} - R_{even,avr}$ and the frequency offset estimate being provided by the formula:

$$\Delta f = \frac{1}{2\pi T}\arctan\left(\frac{\Im m(R)}{\Re e(R)}\right)$$

The invention also provides a process for processing the CPICH pilot signals r(i) received from the two antennas of a base station which involves the steps:
  extracting the received CPICH signal included in the CPICH channel;
  performing a first processing branch (left) comprising the steps of:
    computing a first intermediate value x(i) in accordance with the formula:

$x(i)=r(i)+r(i+2)$ computing a second intermediate value y(i) derived from the first intermediate value x(i) in accordance with the formula:

$y(i)=x(i).x^*(i+1)$ where $x^*(i+1)$ is the complex conjugate of $x(i+1)$
  performing a second processing branch (right)) comprising the steps of:
    computing a third intermediate value x'(i) in accordance with the formula:

$x'(i)=r(i)-r(i+2)$ computing a fourth intermediate value t(i) derived from the third intermediate value x'(i) in accordance with the formula:

$t'(2k)=x'(2k)$ and $t'(2k+1)=-x'(2k+1)$ computing a fifth intermediate value y'(i) derived from the fourth intermediate value t'(i) in accordance with the formula:

$y'(i)=t'(i).t'^*(i+1)$ computing a sixth and seventh intermediate values Z and Z' in accordance with the formulas:

$$Z(2k)=y(2k)+y'(2k)$$

$$Z'(2k+1)=y(2k+1)+y'(2k+1)$$

respectively computing an eight and a ninth values S and S' in accordance with the following formulation:

$$S=1/N \Sigma Z(k) \text{ for } k=1 \text{ to } N$$

$$S'=1/N \Sigma Z'(k) \text{ for } k=1 \text{ to } N$$

performing a test to determine whether the absolute value of the real part of S' is superior to the absolute value of the imaginary part of S' and, in that case, computing (30) a tenth intermediate value R as follows:

$$R=S'+S$$

And, conversely if the absolute value of the real part of S' is inferior to the absolute value of the imaginary part of S', computing R in accordance with the formula:

$$R=S'-S$$

The offset estimation is then simply computed as follows:

$$\Delta f = \frac{1}{2\pi T} \arctan\left(\frac{\Im m(R)}{\Re e(R)}\right)$$

where $\Re e(R)$ and $\Im m(R)$ are the real and imaginary parts, respectively of the tenth intermediate value R.

The invention is particularly suitable for the achievement of a UMTS receiver of a User Equipment (UE) such as a mobile telephone or a Portable Document Assistant.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENT

The invention can be implemented in digital electronic circuitry forming a mobile telephone or a Portable Digital Assistant (PDA) including hardware circuits with a combination of firmware and software.

The method which is proposed is based on the computation of the phase discriminator, that is to say the sum of the autocorrelation of the samples sequence.

To simplify the mathematical treatment, we use a symbol-rate model for the CPICH symbols transmitted from Tx antenna 1 and Tx antenna 2 in symbol time instants k= 0,1, . . . ,149, during one 10-ms radio frame, which reads:

$$p_1[k] = (1+j)$$

$$p_2[k] = (1+j)(-1)^{\lfloor \frac{k+1}{2} \rfloor}$$

FIG. 1 illustrates the sign pattern (applied to (1+j)) resulting from those formulas.

These Tx symbols are transmitted via time-varying channel coefficients to obtain the effective received symbol (on one single Rx antenna) in time instants, described by k= 0,1, . . . ,149.

$$r[k] = (h_1[k]p_1[k] + h_2[k]p_2[k])\exp((j2\pi k\Delta fT + \varphi_0)) + n[k]$$

$$r[k] = (1+j)\left(h_1[k] + (-1)^{\lfloor \frac{k+1}{2} \rfloor} h_2[k]\right)\exp((j2\pi k\Delta fT + \varphi_0)) + n[k]$$

where $h_m[k]$ is the channel gain from antenna m at time instant k and n[k] is the additive Gaussian noise with zero mean and variance $\sigma^2$.

$\Delta f$ corresponds to the frequency offset and assumed to be identical for both antennas.

Figure 3:
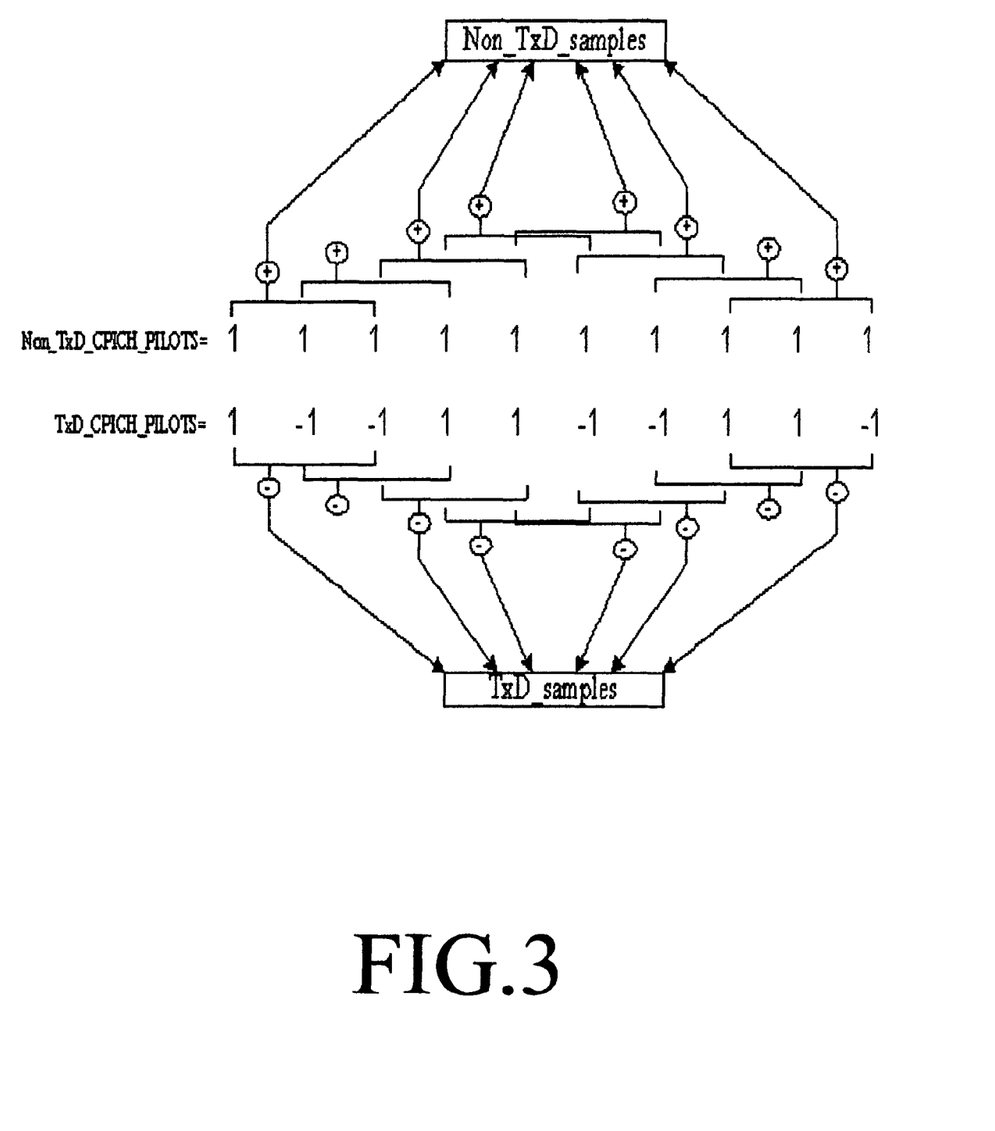
FIG. 3 illustrates the principle of the separation of the two signals transmitted through the two emitting antennas.

The method is based on a separation of the received pilot signals from the two transmit antennas—summarized in FIG. 3—in order to keep the sampling period of the resulting samples equal to T, which is a condition for keeping a relatively wide estimation of frequency offsets.

Now considering $r_{NoTxd}$ and $r_{Txd}[k]$ being the computed signals respectively containing only the pilot transmitted from antenna 1 and antenna 2, computed write the following formula:

$$r_{NoTxd}[k] = r[k] + r[k+2] = (1+j)\left(S_1[k] + (-1)^{\lfloor \frac{k+1}{2} \rfloor} D_2[k]\right) + N_s[k]$$

$$r_{Txd}[k] = (-1)^{\lfloor \frac{k+1}{2} \rfloor}(r[k] - r[k+2]) =$$
$$(1+j)\left(S_2[k] + (-1)^{\lfloor \frac{k+1}{2} \rfloor} D_1[k]\right) + (-1)^{\lfloor \frac{k+1}{2} \rfloor} N_d[k]$$

Where for m=1,2

$$S_m[k]=h_m\exp(j\varphi_0)(\exp(jk\Phi)+\exp(j(k+2)\Phi))$$

$$D_m[2k]=h_m\exp(j\varphi_0)(\exp(jk\Phi)-\exp(j(k+2)\Phi))$$

$$N_s[k]=n[k]+n[k+2]$$

$$N_d[k]=n[k]-n[k+2]$$

$h_m$ corresponding to the channel response for antenna m (m=1, 2), j corresponding to the imaginary complex such as $j^2=-1$ and $\Phi=2\pi\Delta f T$ It can be seen that the sampling period of $r_{NoTxd}$ and $r_{Txd}[k]$ sequences is T, which will allow a possible estimation range of $$|\Delta f| \le \frac{1}{2T}$$

We then compute $R_{NoTxd}[k]$ and $R_{Txd}[k]$ from the separated signal $r_{NoTxd}$ and $r_{Txd}[k]$ as $$R_{r_{NoTxd}r_{NoTxd}}[k] = r_{NoTxd}[k] * \text{conj}(r_{NoTxd}[k+1])$$

$$R_{r_{Txd}r_{Txd}}[k] = r_{Txd}[k] * \text{conj}(r_{Txd}[k+1])$$

which simplifies, with the assumption that the channel is constant (i.e. $h_1[k]=h_1$ and $h_2[k]=h_2$), to $$R_{r_{NoTxd}r_{NoTxd}}[k] = 2\left(R_{S_1S_1} + (-1)^{\lfloor\frac{k+1}{2}\rfloor}(-1)^{\lfloor\frac{k+2}{2}\rfloor}R_{D_2D_2} + \right.$$
$$\left.(-1)^{\lfloor\frac{k+2}{2}\rfloor}R_{S_1D_2} + (-1)^{\lfloor\frac{k+1}{2}\rfloor}R_{D_2S_1}\right) + R_{N_sN_s}[k]$$

$$R_{r_{Txd}r_{Txd}}[k] = 2\left(R_{S_2S_2} + (-1)^{\lfloor\frac{k+1}{2}\rfloor}(-1)^{\lfloor\frac{k+2}{2}\rfloor}R_{D_1D_1} + (-1)^{\lfloor\frac{k+2}{2}\rfloor}R_{S_2D_1} + \right.$$
$$\left.(-1)^{\lfloor\frac{k+1}{2}\rfloor}R_{D_1S_2}) + (-1)^{\lfloor\frac{k+1}{2}\rfloor}(-1)^{\lfloor\frac{k+2}{2}\rfloor}R_{N_dN_d}[k]$$

where, for m=1,2 and n=1,2

$$R_{S_mS_m} = S_m[k].\text{conj}(S_m[k+1]) = 2|h_m|^2(\exp(j\Phi)(1+\cos(2\Phi)))$$

$$R_{D_mD_m} = D_m[k].\text{conj}(D_m[k+1]) = 2|h_m|^2(\exp(j\Phi)(1-\cos(2\Phi)))$$

$$R_{S_mD_n} = S_m[k].\text{conj}(D_n[k+1]) = -2jh_mh_n*\exp(j\Phi)\sin(2\Phi)$$

$$R_{N_sN_s} = N_s[k].\text{conj}(N_s[k+1])$$

$$R_{N_dN_d} = N_d[k].\text{conj}(N_d[k+1])$$

If k is even, one may demonstrate that:

$$R_{even}[k] = R_{r_{Txd}r_{Txd}}[k] + R_{r_{NoTxd}r_{NoTxd}}[k] = 4\exp(j\Phi)(|h_1|^2 + |h_2|^2)\cos(2\Phi) + R_{N_sN_s}[k] - R_{N_dN_d}[k]$$

And if k is odd, $$R_{odd}[k] = R_{r_{Txd}r_{Txd}}[k] + R_{r_{NoTxd}r_{NoTxd}}[k] = 4\exp(j\Phi)(|h_1|^2 + |h_2|^2) + (R_{N_sN_s}[k] + R_{N_dN_d}[k])$$

In order to attenuate the noise effect, we compute an average over several samples of $R_{even}[k]$ and $R_{odd}[k]$ as $$R_{even,avr} = \frac{1}{N_2 - N_1}\sum_{k=N_1,k\text{ even}}^{N_2} R_{even}[k] = 4\exp(j\Phi)(|h_1|^2 + |h_2|^2)\cos(2\Phi) +$$
$$\frac{1}{N_2 - N_1}\sum_{k=N_1,k\text{ even}}^{N_2}(R_{N_sN_s}[k] - R_{N_dN_d}[k])$$

$$R_{odd,avr} = \frac{1}{N_2 - N_1}\sum_{k=N_1,k\text{ odd}}^{N_2} R_{odd}[k] =$$
$$4\exp(j\Phi)(|h_1|^2 + |h_2|^2) + \frac{1}{N_2 - N_1}\sum_{k=N_1,k\text{ odd}}^{N_2}(R_{N_sN_s}[k] + R_{N_dN_d}[k])$$

Both of these two sums $R_{even,avr}$ and $R_{odd,avr}$ can be considered as independent estimators and the frequency offset estimation is given respectively by $$\Delta f = \frac{1}{2\pi T}\arctan\left(\frac{\Im m(R_{even,avr})}{\Re e(R_{even,avr})}\right)$$

and $$\Delta f = \frac{1}{2\pi T}\arctan\left(\frac{\Im m(R_{odd,avr})}{\Re e(R_{odd,avr})}\right)$$

The one based on $R_{even,avr}$ is dependent on the FO due to the $\cos(2\Phi)$ and is expected to show poor results around $$|\Phi| = \frac{\pi}{4} \text{ or } |\Phi| = \frac{3\pi}{4}$$

(i.e. FO=±1875 or FO=±5625)

Also, it should be noticed that this $\cos(2\Phi)$ introduces a sign inversion for $$|\Phi| \in \left[\frac{\pi}{4}, \frac{3\pi}{4}\right]$$

Thus, in one particular advantageous embodiment, the two discriminators values $R_{even,avr}$ and $R_{odd,avr}$ are accumulated as follows:

If $\Re e(R_{odd,avr})| > |\Im m(R_{odd,avr})|$ $$R = R_{odd,avr} + R_{even,avr}$$

else $$R = R_{odd,avr} - R_{even,avr}$$

The correlation R is passed to the arctan function in order to extract the frequency offset estimate:

$$\Delta f = \frac{1}{2\pi T}\arctan\left(\frac{\Im m(R)}{\Re e(R)}\right)$$

Figure 2:
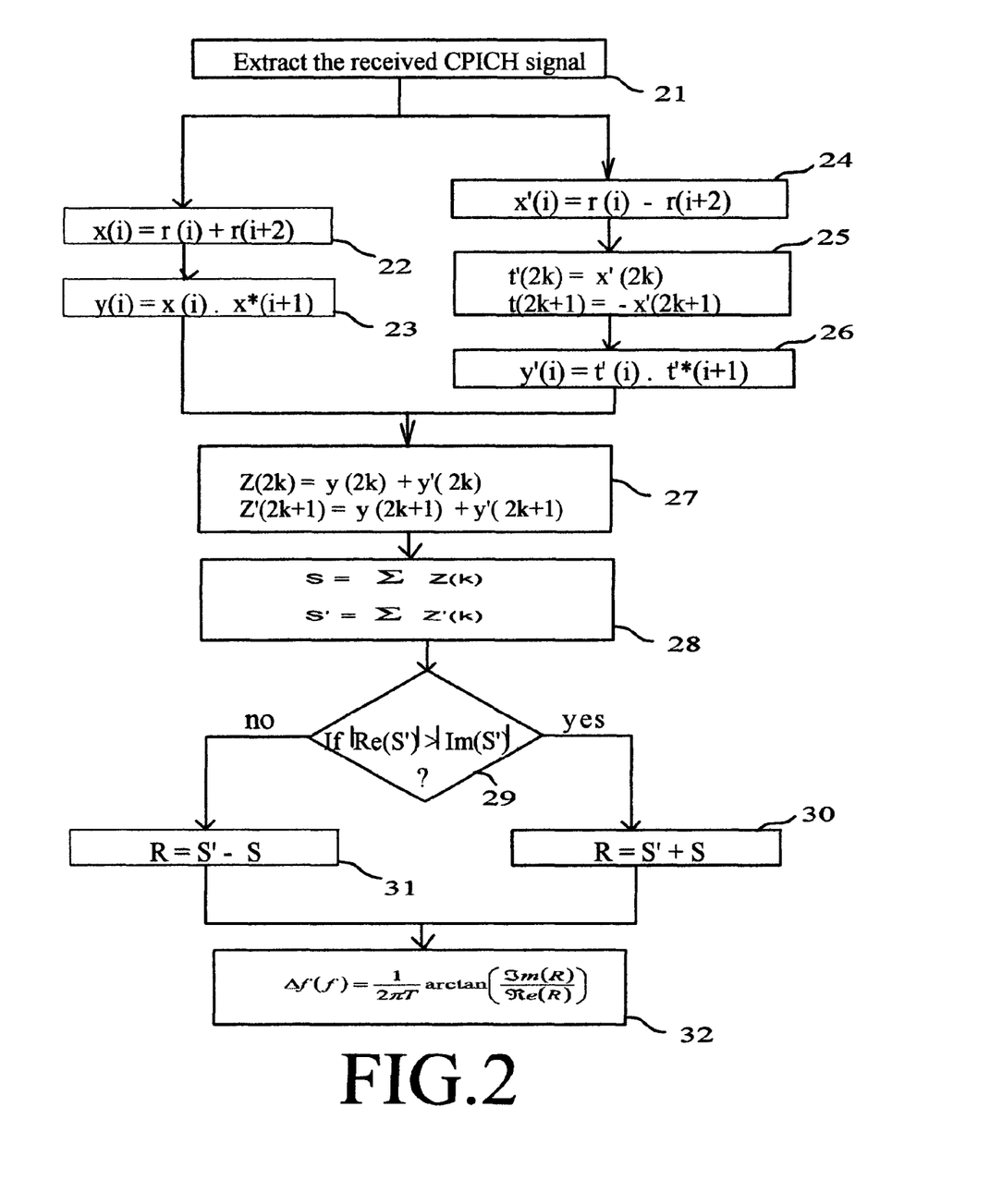
FIG. 2 illustrates one embodiment of the method for computing the offset frequency in accordance with the present invention.

With respect to FIG. 2, there is now described one particular embodiment of a method for computing the frequency offset Δf which provides both accuracy and a relatively wide range of frequency use.

In a step 21, the process extracts the received CPICH signal included in the CPICH channel. As known in the art, it is assumed that the signal received at the antenna of the user equipment is properly equalized, de-spreaded and descrambled in accordance with the W-CDMA standard. Such operations are well known to a skilled man and, therefore, do not need further development. It suffices to recall that the received despreaded signal is modulated with the appropriate code in order to extract the predetermined CPICH channel. Such channel generates the sum of the two pilot signals transmitted by the base station.

From step 21, two parallel sequences are performed in order to separate the two pilot channels, with a left branch based on steps 22-23 and a right branch based on steps 24-25-26.

Considering the left branch, one sees that the process proceeds to a step 22, the process proceeds with the computation of a first intermediate value x(i) in accordance with the formula:

$$x(i)=r(i)+r(i+2)$$

It can be seen that step 21 achieves the computation of $r_{NoTxd}[k]$ which was mentioned above:

$$r_{NoTxd}[k] = r[k] + r[k+2] = (1+j)\left(S_1[k] + (-1)^{\lfloor\frac{k+1}{2}\rfloor}D_2[k]\right) + N_s[k]$$

Then, in a step 23, the process proceeds with the computation of a second intermediate value y(i) derived from the first intermediate value x(i) in accordance with the formula:

$$y(i)=x(i).x^*(i+1)$$

with x*(i+1) being the conjugate value of x(i+1).

Such second intermediate value corresponds to the computation of $R_{r_{NoTxd}r_{NoTxd}}[k]$ mentioned above.

Considering the right branch, one sees that, after completion of step 21, the process proceeds to a step 24, the process proceeds with the computation of a third intermediate value x'(i) in accordance with the formula:

$$x'(i)=r(i)-r(i+2)$$

Then, in a step 25, the process proceeds with the computation of a fourth intermediate value t(i) derived from the third intermediate value x'(i) in accordance with the formula:

$$t'(2k)=x'(2k) \text{ and}$$

$$t'(2k+1)=-x'(2k+1)$$

It can be seen that steps 24-25 achieves the computation of the value of $r_{txd}[k]$ which was mentioned above:

$$r_{Txd}[k] = (-1)^{\lfloor\frac{k+1}{2}\rfloor}(r[k]-r[k+2]) =$$
$$(1+j)\left(S_2[k] + (-1)^{\lfloor\frac{k+1}{2}\rfloor}D_1[k]\right) + (-1)^{\lfloor\frac{k+1}{2}\rfloor}N_d[k]$$

Then, in a step 26, the process proceeds with the computation of a fifth intermediate value y'(i) derived from the fourth intermediate value t'(i) in accordance with the formula:

$$y'(i)=t'(i).t'^*(i+1)$$

where t'*(i+1) corresponds to the conjugate of the complex t'(i+1).

Step 26 achieves the computation of $R_{r_{Txd}r_{Txd}}[k]$ mentioned above

Then, in a step 27, the process proceeds with the computation of a sixth and seventh intermediate values, respectively Z and Z' which are computed as follows:

$$Z(2k)=y(2k)+y'(2k)$$

$$Z'(2k+1)=y(2k+1)+y'(2k+1)$$

Then, in a step 28, the process proceeds with the average of the Z and Z' value over a period of N samples in order to respectively generate an eight and a ninth values S and S' in accordance with the following formulation:

$$S=1/N \, \Sigma \, Z(k) \text{ for } k=1 \text{ to } N$$

$$S'=1/N \, \Sigma \, Z'(k) \text{ for } k=1 \text{ to } N$$

The process then proceeds with a step 29 which is a test for determining whether the absolute value of the real part of S' is superior to the absolute value of the imaginary part of S', in which case, the process proceeds with a step 30 where the two values S and S' are added in order to generate a tenth intermediate value R as follows:

$$R=S'+S$$

The process then proceeds to a step 32.

If the absolute value of the real part of S' is inferior to the absolute value of the imaginary part of S' in step 29, the process proceeds to a step 31 where the value of S is subtracted from that of S' in order to compute R in accordance with the formula:

$$R=S'-S$$

After completion of steps 30 and 31, the process proceeds to a step 32 where the frequency offset estimation is computed as follows:

$$\Delta f = \frac{1}{2\pi T}\arctan\left(\frac{\Im m(R)}{\Re e(R)}\right)$$

where $\Re e(R)$ and $\Im m(R)$ are the real and imaginary parts, respectively of the tenth intermediate value R.

The method which was described above shows a sampling period of T, which allows coverage of possible estimation range for a value of $$|\Delta f| \leq \frac{1}{2T}$$

Figure 4:
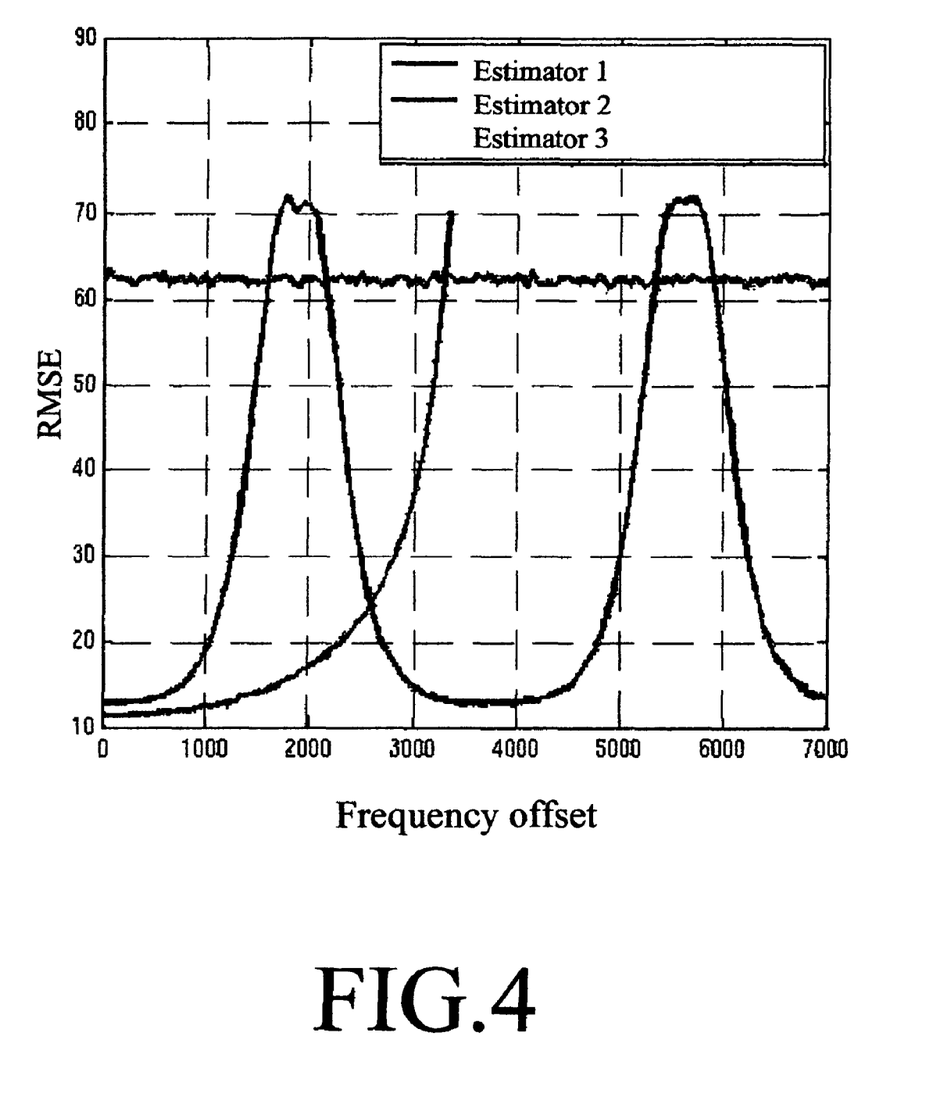
FIG. 4 illustrates the Root Mean Square Error (RMSE) of the frequency offset estimation (FOE) as a function of the frequency offset (FO) for an AWGN environment and SNR=0 dB
Figure 5:
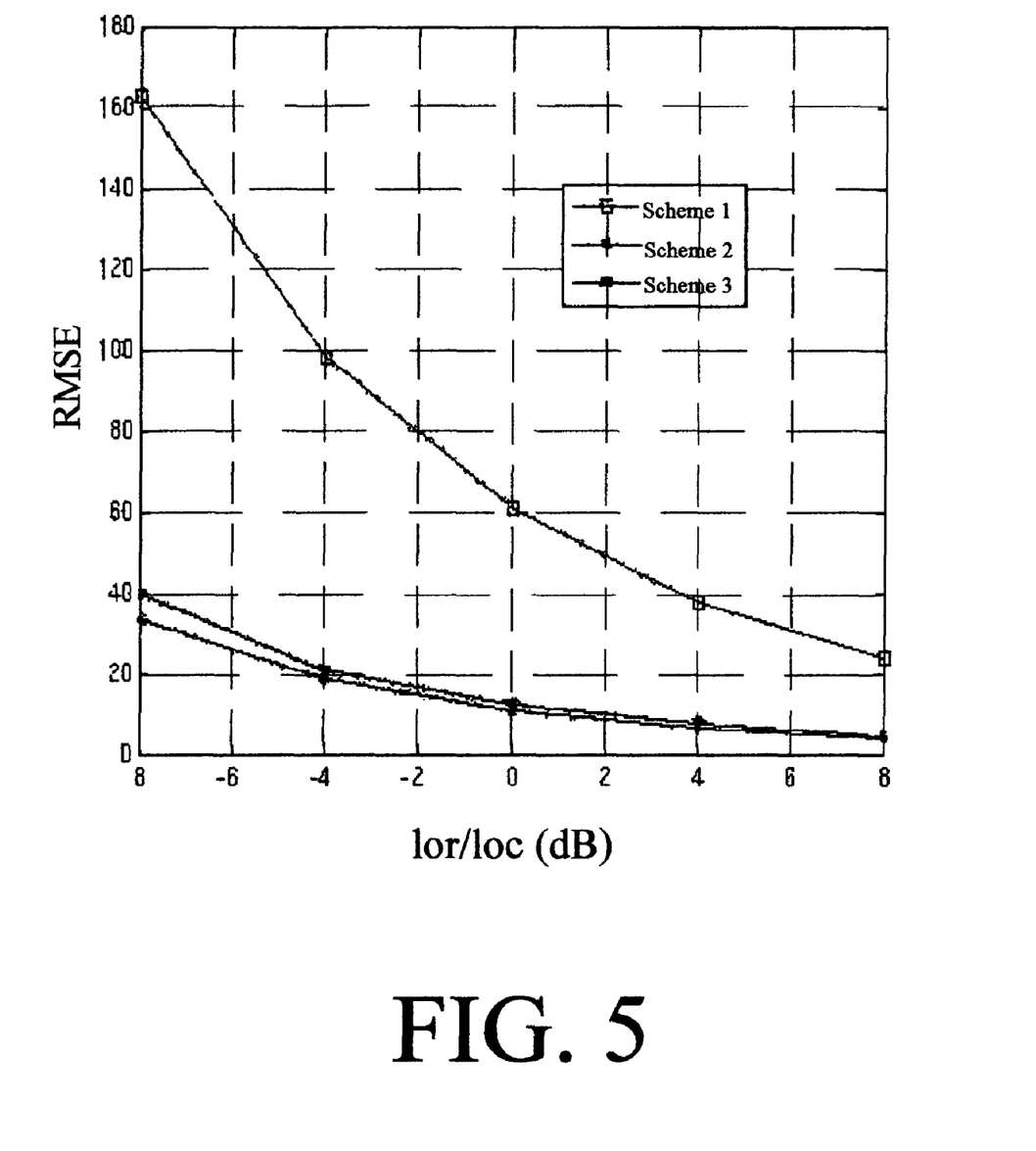
FIG. 5 illustrates the RMSE of the frequency offset estimation as a function of Ior/Ioc, in an AWGN environment and for FO=0 Hz
Figure 6:
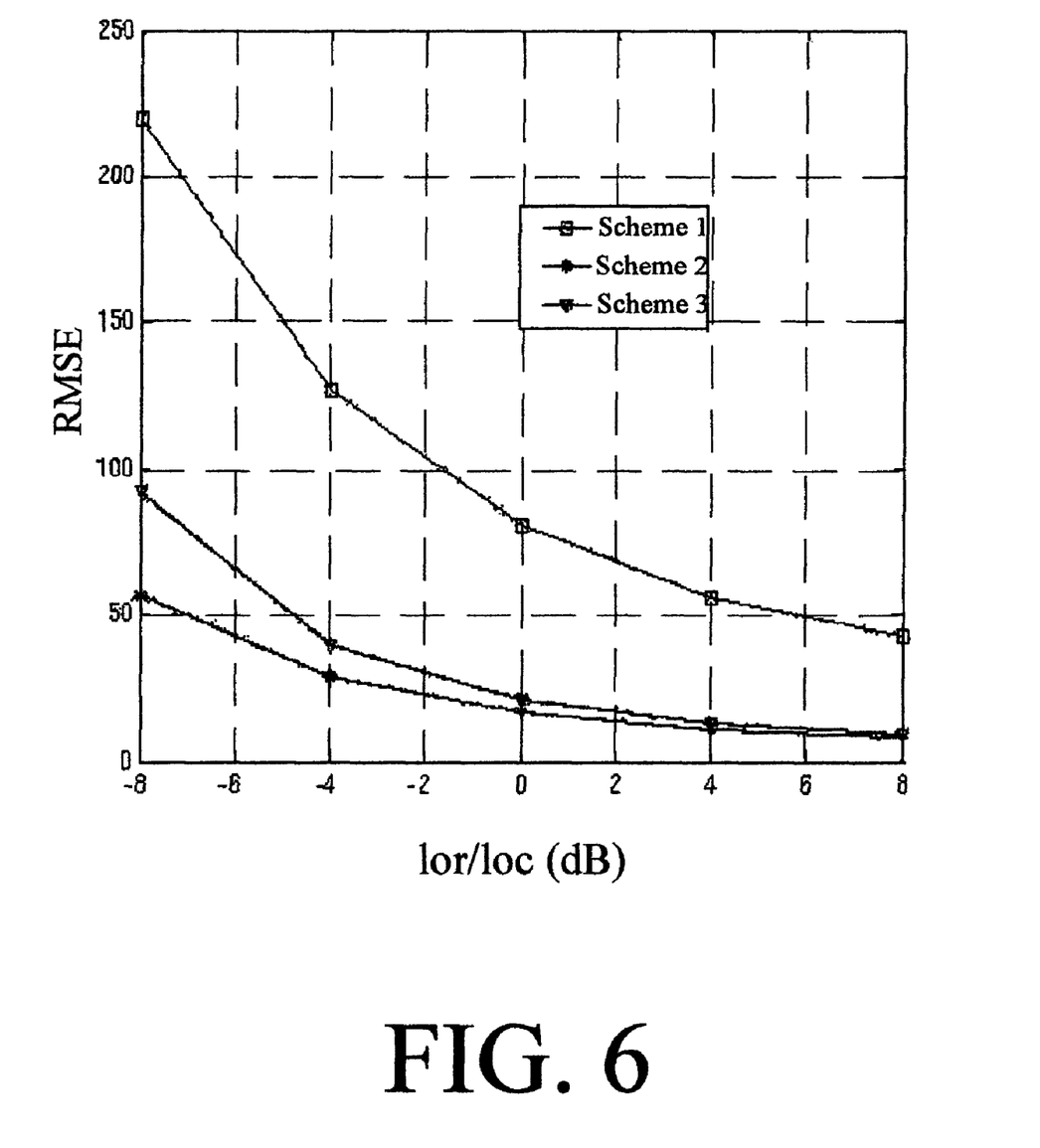
FIG. 6 illustrates the RMSE of the frequency offset as a function of Ior/Ioc, in case 1 environment (defined in the 3GPP specs) and for FO=0 Hz.

FIGS. 4, 5 and 6 are comparative flow charts allowing comparison of the process of the invention which was described above (and referred to as scheme no 3) with respect of two prior art method, namely scheme 1 and 2.

FIG. 4 represents the Root Mean Squared Error (RMSE) of the frequency offset estimate (FOE) as a function of the frequency offset (FO) for AWGN and a SNR=0 dB. It should be noticed that a prior art method—referred to as scheme 2—only have limited performances to FO<3500 Hz since this estimator cannot estimate larger FOs. The curve which is represented highlights the expected behaviors of the different estimators. As expected, estimator 3 (which is the one of the invention) shows degraded performances around 1875 Hz and 5625 Hz which is equivalent to the degradation shown by scheme 2 around 3.5 KHz. However, our proposed estimator has performance very close to those of estimator 2 for small FOs, which corresponds to the working regime after the AFC loop convergence. Estimator 2 has the advantage of covering a much larger interval.

FIGS. 5 and 6 plot the FOE's RMSE as a function of Ior/Ioc for FO=0 Hz (for AWGN and case 1 propagation scenarios respectively).

The considered SPW simulations setups are as follows:
For AWGN:
Measurement Reference Channel: 12.2 Kbps
Iorx/Ioc=–i dB
DPCH_Ec/Iorx=–16.6 dB
Ioc=–60 dBm
For fading multi-path case 1:
Measurement Reference Channel: 12.2 Kbps Iorx/Ioc=9 dB DPCH_Ec/Iorx=–15 dB Ioc=–60 dBm
Multi-path propagation: 2 paths
Powers: 0 dB, –10 dB
Delays: 0 ns, 976 ns

The invention claimed is:

1. A process for computing an estimation of the frequency offset in a receiver for a UMTS communication network said receiver receives the signal transmitted by two antennas and including two Common Pilot CHannels (CPICH), said process involving a pre-processing based on the separation of the two signals by means of the computation of $$r_{NoTxd}[k] = r[k] + r[k+2] = (1+j)\left(S_1[k] + (-1)^{\lfloor \frac{k+1}{2} \rfloor} D_2[k]\right) + N_s[k]$$

$$r_{Txd}[k] = (-1)^{\lfloor \frac{k+1}{2} \rfloor}(r[k] - r[k+2]) =$$
$$(1+j)\left(S_2[k] + (-1)^{\lfloor \frac{k+1}{2} \rfloor} D_1[k]\right) + (-1)^{\lfloor \frac{k+1}{2} \rfloor} N_d[k]$$

Where
r[k] is the received signal at the instant k;
$r_{NoTxd}$ and $r_{Txd}$ are the result of said pre-processing;
where for m=1,2

$S_m[k] = h_m \exp(j\phi_0)(\exp(jk\Phi) + \exp(j(k+2)\Phi))$ $D_m[2k] = h_m \exp(j\phi_0)(\exp(jk\Phi) - \exp(j(k+2)\Phi))$ $N_s[k] = n[k] + n[k+2]$ $N_d[k] = n[k] - n[k+2]$ n[k] corresponding to the noise components in the received signal at instant k
$h_m$ corresponding to the channel response for antenna m (m=1, 2),
j corresponding to the imaginary complex such as $j^2=-1$
and $\Phi=2\pi \Delta f T$
said pre-processing being then followed by an estimation of the frequency offset of the received signal.

2. The process according to claim 1 wherein the frequency offset estimation is based on one estimator $R_{even,avr}$ computed in accordance with the following formulas:

$$R_{even,avr} = \frac{1}{N_2 - N_1} \sum_{k=N_1, k \, even}^{N_2} R_{even}[k]$$

with $R_{even}[k] = R_{r_{Txd} r_{Txd}}[k] + R_{r_{NoTxd} r_{NoTxd}}[k] = 4\exp(j\Phi)(|h_1|^2 + |h_2|^2)\cos(2\Phi) + R_{N_d N_d}[k]$ in which $$R_{r_{NoTxd} r_{NoTxd}}[k] =$$
$$r_{NoTxd}[k] * conj(r_{NoTxd}[k+1]) = 2\left(R_{S_1 S_1} + (-1)^{\lfloor \frac{k+1}{2} \rfloor}(-1)^{\lfloor \frac{k+2}{2} \rfloor} R_{D_2 D_2} + (-1)^{\lfloor \frac{k+2}{2} \rfloor} R_{S_1 D_2} + (-1)^{\lfloor \frac{k+1}{2} \rfloor} R_{D_2 S_1}\right) + R_{N_s N_s}[k]$$

$$R_{r_{Txd} r_{Txd}}[k] = r_{Txd}[k] * conj(r_{Txd}[k+1]) =$$
$$2\left(R_{S_2 S_2} + (-1)^{\lfloor \frac{k+1}{2} \rfloor}(-1)^{\lfloor \frac{k+2}{2} \rfloor} R_{D_1 D_1} + (-1)^{\lfloor \frac{k+2}{2} \rfloor} R_{S_2 D_1} + (-1)^{\lfloor \frac{k+1}{2} \rfloor} R_{D_1 S_2}\right) + (-1)^{\lfloor \frac{k+1}{2} \rfloor}(-1)^{\lfloor \frac{k+2}{2} \rfloor} R_{N_d N_d}[k]$$

where, for m=1,2 and n=1,2

$R_{S_m S_m} = S_m[k].conj(S_m[k+1]) = 2|h_m|^2(\exp(j\Phi)(1+\cos(2\Phi)))$ $R_{D_m D_m} = D_m[k].conj(D_m[k+1]) = 2|h_m|^2(\exp(j\Phi)(1-\cos(2\Phi)))$ $R_{S_m D_n} = S_m[k].conj(D_n[k+1]) = -2jh_m h_n^* \exp(j\Phi)\sin(2\Phi)$ $R_{N_s N_s} = N_s[k].conj(N_s[k+1])$ $R_{N_d N_d} = N_d[k].conj(N_d[k+1])$ The frequency offset estimate being provided by the formula:

$$\Delta f = \frac{1}{2\pi T} \arctan\left(\frac{\Im m(R)}{\Re e(R)}\right).$$

3. The process according to claim 1 wherein the frequency offset estimation is based on one estimator $R_{odd,avr}$ computed in accordance with the following formulas:

$$R_{odd,avr} = \frac{1}{N_2 - N_1} \sum_{k=N_1, k \, odd}^{N_2} R_{odd}[k]$$

with $R_{odd}[k] = R_{r_{Txd} r_{Txd}}[k] + R_{r_{NoTxd} r_{NoTxd}}[k] = 4\exp(j\Phi)(|h_1|^2 + |h_2|^2) + (R_{N_s N_s}[k] + R_{N_d N_d}[k])$ in which $$R_{r_{NoTxd} r_{NoTxd}}[k] =$$
$$r_{NoTxd}[k] * conj(r_{NoTxd}[k+1]) = 2\left(R_{S_1 S_1} + (-1)^{\lfloor \frac{k+1}{2} \rfloor}(-1)^{\lfloor \frac{k+2}{2} \rfloor} R_{D_2 D_2} + (-1)^{\lfloor \frac{k+2}{2} \rfloor} R_{S_1 D_2} + (-1)^{\lfloor \frac{k+1}{2} \rfloor} R_{D_2 S_1}\right) + R_{N_s N_s}[k]$$

$$R_{r_{Txd} r_{Txd}}[k] = r_{Txd}[k] * conj(r_{Txd}[k+1]) =$$
$$2\left(R_{S_2 S_2} + (-1)^{\lfloor \frac{k+1}{2} \rfloor}(-1)^{\lfloor \frac{k+2}{2} \rfloor} R_{D_1 D_1} + (-1)^{\lfloor \frac{k+2}{2} \rfloor} R_{S_2 D_1} + (-1)^{\lfloor \frac{k+1}{2} \rfloor} R_{D_1 S_2}\right) + (-1)^{\lfloor \frac{k+1}{2} \rfloor}(-1)^{\lfloor \frac{k+2}{2} \rfloor} R_{N_d N_d}[k]$$

where, for m=1,2 and n=1,2

$R_{S_m S_m} = S_m[k].conj(S_m[k+1]) = 2|h_m|^2(\exp(j\Phi)(1+\cos(2\Phi)))$ $R_{D_m D_m} = D_m[k].conj(D_m[k+1]) = 2|h_m|^2(\exp(j\Phi)(1-\cos(2\Phi)))$ $R_{S_m D_n} = S_m[k].conj(D_n[k+1]) = -2jh_m h_n^* \exp(j\Phi)\sin(2\Phi)$ $R_{N_s N_s} = N_s[k].conj(N_s[k+1])$ $R_{N_d N_d} = N_d[k].conj(N_d[k+1])$ The frequency offset estimate being provided by the formula:

$$\Delta f = \frac{1}{2\pi T} \arctan\left(\frac{\Im m(R)}{\Re e(R)}\right).$$

4. The process according to claim 2 wherein the frequency offset estimation is computed on the basis of both $R_{odd,avr}$ and $R_{even,avr}$ in accordance with the formula:

If $\Re e(R_{odd,avr})|>|\Im m(R_{odd,avr})|$ $R=R_{odd,avr}+R_{even,avr}$ else $R=R_{odd,avr}-R_{even,avr}$ and the frequency offset estimate being provided by the formula:

$$\Delta f = \frac{1}{2\pi T}\arctan\left(\frac{\Im m(R)}{\Re e(R)}\right).$$

5. A process for computing an estimation of the frequency offset in a receiver for a UMTS communication network said receiver receives the signal transmitted by two antennas and including two Common Pilot CHannels (CPICH), said process involving the steps of:
  extracting the received CPICH signal included in the CPICH channel;
  performing a first processing branch (left) comprising the steps of:
    computing a first intermediate value x(i) in accordance with the formula:

$x(i)=r(i)+r(i+2)$ computing a second intermediate value y(i) derived from the first intermediate value x(i) in accordance with the formula:

$y(i)=x(i).x^*(i+1)$ performing a second processing branch (right) comprising the steps of:
    computing a third intermediate value x'(i) in accordance with the formula:

$x'(i)=r(i)-r(i+2)$ computing a fourth intermediate value t(i) derived from the third intermediate value x'(i) in accordance with the formula:

$t'(2k)=x'(2k)$ and $t'(2k+1)=-x'(2k+1)$ computing a fifth intermediate value y'(i) derived from the fourth intermediate value t'(i) in accordance with the formula:

$y'(i)=t'(i).t'^*(i+1)$ computing a sixth and seventh intermediate values Z and Z' in accordance with the formulas:

$Z(2k)=y(2k)+y'(2k)$ $Z'(2k+1)=y(2k+1)+y'(2k+1)$ respectively computing an eight and a ninth values S and S' in accordance with the following formulation:

$S=1/N \Sigma Z(k)$ for $k=1$ to $N$ $S'=1/N \Sigma Z'(k)$ for $k=1$ to $N$ performing a test to determine whether the absolute value of the real part of S' is superior to the absolute value of the imaginary part of S' and, in that case, computing a tenth intermediate value R as follows:

$R=S'+S$

And, conversely if the absolute value of the real part of S' is inferior to the absolute value of imaginary part of S', computing R in accordance with the formula:

$R=S'-S$

Then, computing the offset estimation in accordance with the formula:

$$\Delta f = \frac{1}{2\pi T}\arctan\left(\frac{\Im m(R)}{\Re e(R)}\right)$$

where $\Re e(R)$ and $\Im m(R)$ are the real and imaginary parts, respectively of the tenth intermediate value R.

6. A receiver for a UMST communication system comprising means for receiving the signals transmitted by two antennas and including two Common Pilot CHannels (CPICH), said receiving comprising means for separating the two signals based on the computation of:

$$r_{NoTxd}[k] = r[k] + r[k+2] = (1+j)\left(S_1[k] + (-1)^{\lfloor\frac{k+1}{2}\rfloor}D_2[k]\right) + N_s[k]$$

$$r_{Txd}[k] = (-1)^{\lfloor\frac{k+1}{2}\rfloor}(r[k] - r[k+2]) =$$
$$(1+j)\left(S_2[k] + (-1)^{\lfloor\frac{k+1}{2}\rfloor}D_1[k]\right) + (-1)^{\lfloor\frac{k+1}{2}\rfloor}N_d[k]$$

Where
r[k] is the received signal at the instant k;
$r_{NoTxd}$ and $r_{Txd}$ are the result of said pre-processing;
Where for m=1,2

$S_m[k]=h_m\exp(j\phi_0)(\exp(jk\Phi)+\exp(j(k+2)\Phi))$ $D_m[2k]=h_m\exp(j\phi_0)(\exp(jk\Phi)-\exp(j(k+2)\Phi))$ $N_s[k]=n[k]+n[k+2]$ $N_d[k]=n[k]-n[k+2]$ n[k] corresponding to the noise components in the received signal at instant k
$h_m$ corresponding to the channel response for antenna m (m=1, 2),
j corresponding to the imaginary complex such as $j^2=-1$ and $\Phi=2\pi \Delta f T$.

7. The receiver according to claim 6 wherein the frequency offset estimation is based on one estimator $R_{even,avr}$ computed in accordance with the following formulas:

$$R_{even,avr} = \frac{1}{N_2-N_1}\sum_{k=N_1,k\ even}^{N_2} R_{even}[k]$$

with $R_{even}[k]=R_{r_{Txd}r_{Txd}}[k]+R_{r_{NoTxd}r_{NoTxd}}[k]=4\exp(j\Phi)(|h_1|^2+|h_2|^2)\cos(2\Phi)+R_{N_sN_s}[k]=R_{N_dN_d}[k]$ in which $$R_{r_{NoTxd}r_{NoTxd}}[k] =$$
$$r_{NoTxd}[k]*conj(r_{NoTxd}[k+1]) = 2\Big(R_{S_1S_1} + (-1)^{\lfloor\frac{k+1}{2}\rfloor}(-1)^{\lfloor\frac{k+2}{2}\rfloor}R_{D_2D_2} +$$
$$(-1)^{\lfloor\frac{k+2}{2}\rfloor}R_{S_1D_2} + (-1)^{\lfloor\frac{k+1}{2}\rfloor}R_{D_2S_1}\Big) + R_{N_sN_s}[k]$$

-continued $$R_{r_{Txd}r_{Txd}}[k] = r_{Txd}[k] * \text{conj}(r_{Txd}[k+1]) =$$

$$2\left(R_{S_2S_2} + (-1)^{\lfloor\frac{k+1}{2}\rfloor}(-1)^{\lfloor\frac{k+2}{2}\rfloor}R_{D_1D_1} + (-1)^{\lfloor\frac{k+2}{2}\rfloor}R_{S_2D_1} + (-1)^{\lfloor\frac{k+1}{2}\rfloor}R_{D_1S_2}\right) + (-1)^{\lfloor\frac{k+1}{2}\rfloor}(-1)^{\lfloor\frac{k+2}{2}\rfloor}R_{N_dN_d}[k]$$

where, for m=1,2 and n=1,2

$R_{S_mS_m}=S_m[k].\text{conj}(S_m[k+1])=2|h_m|^2(\exp(j\Phi)(1+\cos(2\Phi)))$ $R_{D_mD_m}=D_m[k].\text{conj}(D_m[k+1])=2|h_m|^2(\exp(j\Phi)(1-\cos(2\Phi)))$ $R_{S_mD_n}=S_m[k].\text{conj}(D_n[k+1])=-2jh_mh_n^*\exp(j\Phi)\sin(2\Phi)$ $R_{N_sN_s}=N_s[k].\text{conj}(N_s[k+1])$ $R_{N_dN_d}=N_d[k].\text{conj}(N_d[k+1])$ The frequency offset estimate being provided by the formula:

$$\Delta f = \frac{1}{2\pi T}\arctan\left(\frac{\Im m(R)}{\Re e(R)}\right).$$

8. The process according to claim 6 wherein the frequency offset estimation is based on one estimator $R_{odd,avr}$ computed in accordance with the following formulas:

$$R_{odd,avr} = \frac{1}{N_2 - N_1}\sum_{k=N_1,k\text{ odd}}^{N_2}R_{odd}[k]$$

with $R_{odd}[k]=R_{r_{Txd}r_{Txd}}[k]+R_{r_{NoTxd}r_{NoTxd}}[k]=4\exp(j\Phi)(|h_1|^2+|h_2|^2)+(R_{N_sN_s}[k]+R_{N_dN_d}[k])$ in which $$R_{r_{NoTxd}r_{NoTxd}}[k] =$$

$$r_{NoTxd}[k]*\text{conj}(r_{NoTxd}[k+1]) = 2\left(R_{S_1S_1} + (-1)^{\lfloor\frac{k+1}{2}\rfloor}(-1)^{\lfloor\frac{k+2}{2}\rfloor}R_{D_2D_2} + (-1)^{\lfloor\frac{k+2}{2}\rfloor}R_{S_1D_2} + (-1)^{\lfloor\frac{k+1}{2}\rfloor}R_{D_2S_1}\right) + R_{N_sN_s}[k]$$

$$R_{r_{Txd}r_{Txd}}[k] = r_{Txd}[k] * \text{conj}(r_{Txd}[k+1]) =$$

$$2\left(R_{S_2S_2} + (-1)^{\lfloor\frac{k+1}{2}\rfloor}(-1)^{\lfloor\frac{k+2}{2}\rfloor}R_{D_1D_1} + (-1)^{\lfloor\frac{k+2}{2}\rfloor}R_{S_2D_1} + (-1)^{\lfloor\frac{k+1}{2}\rfloor}R_{D_1S_2}\right) + (-1)^{\lfloor\frac{k+1}{2}\rfloor}(-1)^{\lfloor\frac{k+2}{2}\rfloor}R_{N_dN_d}[k]$$

where, for m=1,2 and n=1,2

$R_{S_mS_m}=S_m[k].\text{conj}(S_m[k+1])=2|h_m|^2(\exp(j\Phi)(1+\cos(2\Phi)))$ $R_{D_mD_m}=D_m[k].\text{conj}(D_m[k+1])=2|h_m|^2(\exp(j\Phi)(1-\cos(2\Phi)))$ $R_{S_mD_n}=S_m[k].\text{conj}(D_n[k+1])=-2jh_mh_n^*\exp(j\Phi)\sin(2\Phi)$ $R_{N_sN_s}=N_s[k].\text{conj}(N_s[k+1])$ $R_{N_dN_d}=N_d[k].\text{conj}(N_d[k+1])$ The frequency offset estimate being provided by the formula:

$$\Delta f = \frac{1}{2\pi T}\arctan\left(\frac{\Im m(R)}{\Re e(R)}\right).$$

9. The receiver according to claim 7 wherein the frequency offset estimation is computed based on both $R_{odd,avr}$ and $R_{even,avr}$ in accordance with the formula:

If $|\Re e(R_{odd,avr})|>|\Im m(R_{odd,avr})|$ $R=R_{odd,avr}+R_{even,avr}$ else $R=R_{odd,avr}-R_{even,avr}$ and the frequency offset estimate being provided by the formula:

$$\Delta f = \frac{1}{2\pi T}\arctan\left(\frac{\Im m(R)}{\Re e(R)}\right).$$

10. A receiver for a UMTS communication network comprising means for receiving the signal transmitted by two antennas and including two Common Pilot CHannels (CPICH), said receiver comprising:

means for extracting the received CPICH signal included in the CPICH channel;

means for performing a first processing branch (left) comprising the steps of:

means for computing a first intermediate value x(i) in accordance with the formula:

$x(i)=r(i)+r(i+2)$ means for computing a second intermediate value y(i) derived from the first intermediate value x(i) in accordance with the formula:

$y(i)=x(i). x^*(i+1)$ means for performing a second processing branch (right) comprising the steps of:

means for computing a third intermediate value x'(i) in accordance with the formula:

$x'(i)=r(i)-r(i+2)$ means for computing a fourth intermediate value t(i) derived from the third intermediate value x'(i) in accordance with the formula:

$t'(2k)=x'(2k)$ and $t'(2k+1)=-x'(2k+1)$ means for computing a fifth intermediate value y'(i) derived from the fourth intermediate value t'(i) in accordance with the formula:

$y'(i)=t'(i). t'^*(i+1)$ means for computing a sixth and seventh intermediate values Z and Z' in accordance with the formulas:

$Z(2k)=y(2k)+y'(2k)$ $Z'(2k+1)=y(2k+1)+y'(2k+1)$ respectively computing an eight and a ninth values S and S' in accordance with the following formulation:

$S = \Sigma\, Z(k)$ for $k=1$ to $N$ $S' = \Sigma\, Z'(k)$ for $k=1$ to $N$ means for performing a test to determine whether the absolute value of the real part of S' is superior to the absolute value of the imaginary part of S' and, in that case, computing a tenth intermediate value R as follows:

$R = S' + S$

And, conversely if the absolute value of the real part of S' is inferior to the absolute value of the imaginary part of S', means for computing R in accordance with the formula:

$R = S' - S$

Means for computing the offset estimation in accordance with the formula:

$$\Delta f = \frac{1}{2\pi T} \arctan\left(\frac{\Im m(R)}{\Re e(R)}\right)$$

where $\Re e(R)$ and $\Im m(R)$ are the real and imaginary parts, respectively of the tenth intermediate value R.

11. The mobile telephone for a UMTS communication network comprising the receiver as defined in claims 6.

12. The mobile telephone according to claim 11 wherein it is embodied in a Portable Document Assistant (PDA).

* * * * *